United States Patent
Yoshikawa et al.

(10) Patent No.: US 7,990,669 B2
(45) Date of Patent: Aug. 2, 2011

(54) BATTERY PROTECTION CIRCUIT AND BATTERY DEVICE

(75) Inventors: Kiyoshi Yoshikawa, Chiba (JP); Atsushi Sakurai, Chiba (JP); Toshiyuki Koike, Chiba (JP); Kazuaki Sano, Chiba (JP); Yoshihisa Tange, Chiba (JP)

(73) Assignee: Seiko Instruments Inc., Chiba (JP)

( * ) Notice: Subject to any disclaimer, the term of this patent is extended or adjusted under 35 U.S.C. 154(b) by 375 days.

(21) Appl. No.: 12/393,598

(22) Filed: Feb. 26, 2009

(65) Prior Publication Data

US 2009/0213511 A1    Aug. 27, 2009

(30) Foreign Application Priority Data

Feb. 27, 2008  (JP) .................................. 2008-046374

(51) Int. Cl.
*H02H 3/00*        (2006.01)
(52) U.S. Cl. ........................................ 361/86; 361/91.1
(58) Field of Classification Search .................. None
See application file for complete search history.

(56) References Cited

U.S. PATENT DOCUMENTS

| | | | | |
|---|---|---|---|---|
| 4,714,868 A | * | 12/1987 | Maruyama et al. | 320/101 |
| 7,619,386 B2 | * | 11/2009 | Sasaki et al. | 320/106 |
| 2006/0076934 A1 | * | 4/2006 | Ogata et al. | 320/136 |
| 2008/0169785 A1 | * | 7/2008 | Kim | 320/124 |

FOREIGN PATENT DOCUMENTS

JP        2000-295777 A    10/2000

* cited by examiner

*Primary Examiner* — Stephen W Jackson
*Assistant Examiner* — Terrence R Willoughby
(74) *Attorney, Agent, or Firm* — Brinks Hofer Gilson & Lione

(57) ABSTRACT

Provided is a battery protection circuit and a battery device which may be manufactured at lower cost. Before all terminals of a battery protection circuit are each connected to batteries, even when a logical circuit malfunctions by an operation of a parasitic bipolar transistor formed by P-wells due to a connection order in which the batteries are connected, the logical circuit is reset by an operation of a parasitic bipolar transistor formed by the P-wells. For this reason, a charge/discharge path of the batteries is not interrupted due to the connection order. Accordingly, no limitation is placed on the connection order.

19 Claims, 2 Drawing Sheets

BATTERY PROTECTION CIRCUIT AND BATTERY DEVICE

RELATED APPLICATIONS

This application claims priority under 35 U.S.C. §119 to Japanese Patent Application No. JP2008-046374 filed on Feb. 27, 2008, the entire content of which is hereby incorporated by reference.

BACKGROUND OF THE INVENTION

1. Field of the Invention

The present invention relates to a battery protection circuit for protecting a plurality of batteries connected in series, and to a battery device.

2. Description of the Related Art

Portable devices such as a laptop computer and a cellular phone, in some cases, include a battery device which includes a plurality of batteries connected in series and first and second battery protection circuits. The first battery protection circuit controls charge/discharge of the battery to protect the battery. Should the first battery protection circuit not operate when it is supposed to operate, in order to prevent the battery from igniting due to its overdischarge, the second battery protection circuit stops a function of the battery device. The second battery protection circuit performs the function of ultimately protecting the battery, and thus the battery device may not be used when the second battery protection circuit operates (for example, see JP 2000-295777 A).

More specifically, as illustrated in FIG. 4, a second battery protection circuit 10 monitors voltages of batteries BAT1 to BAT4, and cuts off a fuse 20 provided in a charge/discharge path when at least any one of the voltages is equal to or more than a predetermined voltage. As a result, the charge/discharge path is interrupted, and the battery device is stopped.

Here, as illustrated in FIG. 4, the second battery protection circuit 10 includes a parasitic diode which is formed between a P-well 12a connected to an intermediate terminal VC2 and an N-substrate. In addition, the second battery protection circuit 10 includes a parasitic bipolar transistor 12 in which a base is the N-substrate, an emitter is the P-well 12a, and a collector is a P-well 12b. Moreover, it is assumed that a positive electrode terminal of the battery BAT1 at the uppermost stage is a power supply terminal VDD, a negative electrode terminal of the battery BAT4 at the lowermost stage is a ground terminal VSS, and terminals of the batteries BAT2 and BAT3 are intermediate terminals VC1 to VC3.

Then, for example, when only the intermediate terminal VC2 and the ground terminal VSS are connected to the batteries, a forward current flows from the intermediate terminal VC2 to the power supply terminal VDD via the parasitic bipolar diode, and the parasitic bipolar transistor 12 operates in response to the forward current (base current), whereby a logical circuit 11 malfunctions in some cases. Due to this malfunction, in some cases, the second battery protection circuit 10 outputs a signal for making the battery device unusable.

Accordingly, limitations should be placed on an order of connecting the respective terminals of the second battery protection circuit 10 to the respective batteries, whereby a manufacturing process for the battery device is complicated to reduce a yield, leading to an increase in manufacturing cost for the battery device.

SUMMARY OF THE INVENTION

The present invention has been made in view of the above-mentioned problem, and therefore an object thereof is to provide a battery protection circuit and a battery device which may be manufactured at lower cost.

In order to solve the above-mentioned problem, the present invention provides a battery protection circuit for protecting a plurality of batteries connected in series, including: a power supply terminal to which a positive electrode terminal of the battery at an uppermost stage among the plurality of batteries is connected via a switch group; a ground terminal to which a negative electrode terminal of the battery at a lowermost stage among the plurality of batteries is connected via the switch group; an intermediate terminal to which a connection point between the adjacent batteries among the plurality of batteries is connected via the switch group; a plurality of monitoring circuits for monitoring voltages of the plurality of batteries; a logical circuit for operating so that a charge/discharge path of the plurality of batteries is interrupted when the voltages of the plurality of batteries are equal to or higher than a predetermined voltage; a first well which is provided at the intermediate terminal; a second well which is not provided at the intermediate terminal but provided in a vicinity of the first well; and a third well which is not provided at the intermediate terminal but provided in the vicinity of the first well so as to surround the first well.

Further, in order to solve the above-mentioned problem, the present invention provides a battery device including: a battery protection circuit for protecting a plurality of batteries connected in series, which includes: a power supply terminal to which a positive electrode terminal of the battery at an uppermost stage among the plurality of batteries is connected via a switch group; a ground terminal to which a negative electrode terminal of the battery at a lowermost stage among the plurality of batteries is connected via the switch group; and an intermediate terminal to which a connection point between the adjacent batteries among the plurality of batteries is connected, and further includes: a plurality of monitoring circuits for monitoring voltages of the plurality of batteries; a logical circuit for operating so that a charge/discharge path of the plurality of batteries is interrupted when voltages of the plurality of batteries are equal to or more than a predetermined voltage; a first well which is provided at the intermediate terminal; a second well which is not provided at the intermediate terminal but provided in a vicinity of the first well; and a third well which is not provided at the intermediate terminal but provided in the vicinity of the first well so as to surround the first well; the plurality of batteries; and the switch group.

According to the present invention, before all the respective terminals of the battery protection circuit are connected to the respective batteries, even when the logical circuit malfunctions by an operation of a parasitic bipolar transistor formed by the first well and the second well due to a connection order in which the respective batteries are connected, the logical circuit is reset by an operation of a parasitic bipolar transistor formed by the first well and the third well. As a result, the charge/discharge path of the batteries is not interrupted due to the connection order. Accordingly, no limitation is placed on the connection order, whereby a manufacturing process of the battery device is simplified to increase a yield, and a manufacturing cost for the battery device is reduced.

DETAILED DESCRIPTION OF THE PREFERRED EMBODIMENTS

Hereinafter, embodiments of the present invention are described with reference to the drawings.

First Embodiment

Figure 1:
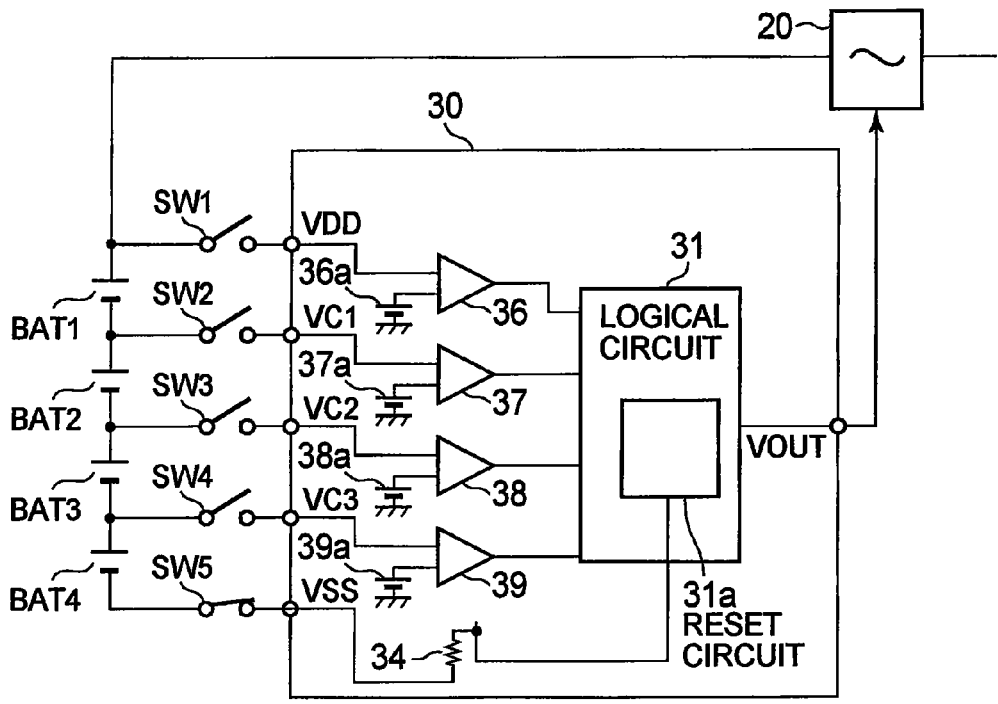
FIG. 1 is a diagram illustrating a battery protection circuit.
Figure 2:
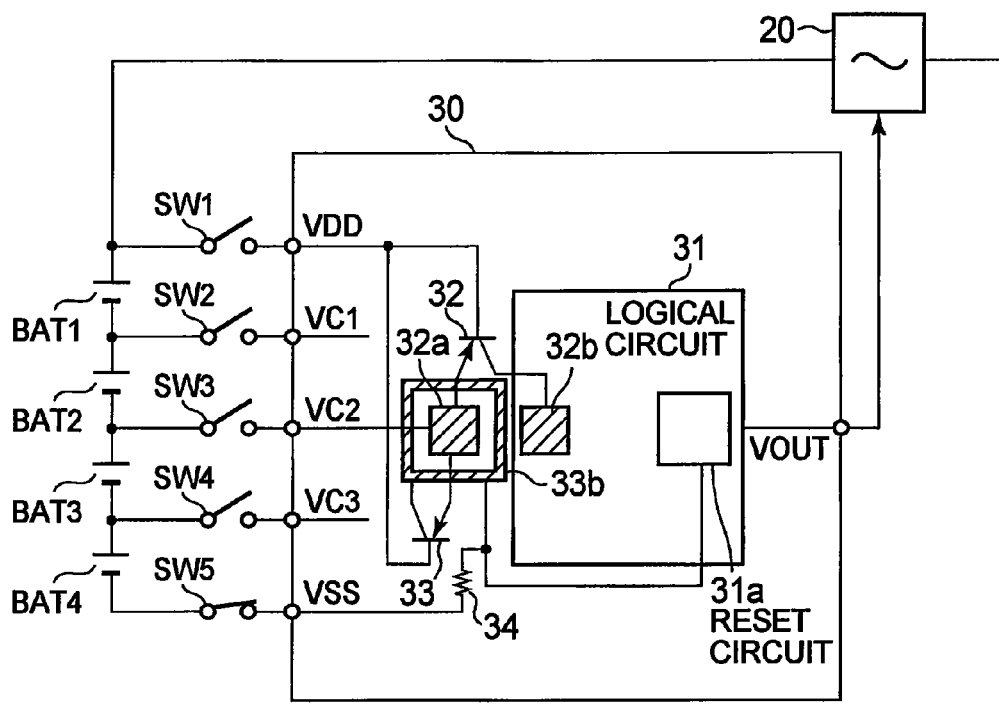
FIG. 2 is a layout diagram illustrating the battery protection circuit.

First, a configuration of a battery protection circuit is described. FIG. 1 is a diagram illustrating the battery protection circuit. FIG. 2 is a layout diagram illustrating the battery protection circuit.

A battery device includes batteries BAT1 to BAT4, switches SW1 to SW5, a battery protection circuit 30, and a fuse 20. The battery protection circuit 30 includes a power supply terminal VDD, intermediate terminals VC1 to VC3, a ground terminal VSS, and an output terminal VOUT. In addition, the battery protection circuit 30 includes a pull-down resistor 34, comparator circuits 36 to 39, reference voltage circuits 36a to 39a, and a logical circuit 31. The logical circuit 31 includes a reset circuit 31a. The comparator circuits and the reference voltage circuits function as a monitoring circuit.

The comparator circuit 38 includes a P-well 32a and a P-well 33b. The logical circuit 31 includes a P-well 32b. The battery protection circuit 30 includes a parasitic diode which is formed between the P-well 32a connected to the intermediate terminal VC2 and an N-substrate. In addition, the battery protection circuit 30 includes a parasitic bipolar transistor 32 in which a base is the N-substrate, an emitter is the P-well 32a, and a collector is the P-well 32b. Moreover, the battery protection circuit 30 includes a parasitic bipolar transistor 33 in which a base is the N-substrate, an emitter is the P-well 32a, and a collector is the P-well 33b.

The batteries BAT1 to BAT4 are connected in series in the stated order. A positive electrode terminal of the battery BAT1 is connected to the power supply terminal VDD via the switch SW1. A positive electrode terminal of the battery BAT2 is connected to the intermediate terminal VC1 via the switch SW2. A positive electrode terminal of the battery BAT3 is connected to the intermediate terminal VC2 via the switch SW3. A positive electrode terminal of the battery BAT4 is connected to the intermediate terminal VC3 via the switch SW4. A negative electrode terminal of the battery BAT4 is connected to the ground terminal VSS via the switch SW5. Moreover, the positive electrode terminal of the battery BAT1 is connected to a charger (not shown) or a load (not shown) via the fuse 20. The power supply terminal VDD, the intermediate terminal VC1, the intermediate terminal VC2, and the intermediate terminal VC3 are connected to non-inverting input terminals of the comparator circuits 36 to 39, respectively. Output terminals of the reference voltage circuits 36a to 39a are connected to inverting input terminals of the comparator circuits 36 to 39, respectively. Output terminals of the comparator circuits 36 to 39 are each connected to input terminals of the logical circuit 31. An output terminal of the logical circuit 31 is connected to the output terminal VOUT. The fuse 20 is provided between the output terminal VOUT and the positive electrode terminal of the battery BAT1.

In the parasitic bipolar transistor 32, the base is connected to the power supply terminal VDD, the emitter is connected to the P-well 32a, and the collector is connected to the P-well 32b. In the parasitic bipolar transistor 33, the base is connected to the power supply terminal VDD, the emitter is connected to the P-well 32a, and the collector is connected to the P-well 33b. The P-well 32a is connected to the intermediate terminal VC2. One end of the pull-down resistor 34 is connected to the ground terminal VSS, and the other end thereof is connected to the P-well 33b and an input terminal of the reset circuit 31a.

It should be noted that, between the power supply terminal VDD and the logical circuit 31, there is provided a voltage regulator (not shown) for generating a constant voltage which is lower than a voltage of the power supply terminal VDD. In addition, between the comparator circuits 36 to 39 and the logical circuit 31, there is provided a level shifter circuit (not shown) for shifting output voltages of the comparator circuits 36 to 39 to lower levels. Moreover, between the logical circuit 31 and the output terminal VOUT, there is provided another level shifter circuit (not shown) for shifting an output voltage of the logical circuit 31 to a higher level.

Here, the P-well 32a is provided at the intermediate terminal VC2. The P-well 32b is not provided at the intermediate terminal VC2 but provided in the vicinity of the P-well 32a. The P-well 33b is not provided at the intermediate terminal VC2 but provided in the vicinity of the P-well 32a so as to surround the P-well 32a.

The reset circuit 31a is designed so that a voltage of the input terminal thereof becomes high when a voltage of the P-well 33b is substantially equal to a voltage of the intermediate terminal VC2.

The reference voltage circuits 36a to 39a generate reference voltages. Based on the reference voltages, the reference voltage circuit 36a and the comparator circuit 36, the reference voltage circuit 37a and the comparator circuit 37, the reference voltage circuit 38a and the comparator circuit 38, and the reference voltage circuit 39a and the comparator circuit 39 monitor voltages of the batteries BAT1 to BAT4, respectively. When the voltages of the batteries BAT1 to BAT4 are equal to or higher than the reference voltages, the logical circuit 31 operates so that a charge/discharge path of the batteries BAT1 to BAT4 is interrupted.

Power supply voltages of the comparator circuits 36 to 39 and the reference voltage circuits 36a to 39a are the voltage of the power supply terminal VDD. That is, the comparator circuits 36 to 39 and the reference voltage circuits 36a to 39a are located in a high-voltage region. The power supply voltage of the logical circuit 31 is a constant voltage which is lower than the voltage of the power supply terminal VDD, which is generated by the voltage regulator. In other words, the logical circuit 31 is located in a low-voltage region.

Further, the battery protection circuit 30 is formed on the N-substrate.

Next, a description is given of an operation of the battery protection circuit 30 in a case where the intermediate terminal VC2 is connected before the power supply terminal VDD is connected, the battery protection circuit 30 is being connected to the batteries BAT1 to BAT4, only the switch SW3 and the switch SW5 are turned on, the intermediate terminal VC2 is connected to the positive electrode terminal of the battery BAT3, and the ground terminal VSS is connected to the negative electrode terminal of the battery BAT4.

The P-well 32a has the highest voltage in the battery protection circuit 30, and thus the forward current flows from the intermediate terminal VC2 to the power supply terminal VDD via the parasitic diode, and the parasitic bipolar transistor 32 operates in response to the forward current (base current). Accordingly, a current flows from the P-well 32a serving as the emitter to the P-well 32b serving as the collector, and the voltage of the P-well 32b becomes the voltage of the intermediate terminal VC2.

At this time, the parasitic bipolar transistor 33 operates in the similar manner as described above, and thus a current flows from the P-well 32a serving as the emitter to the P-well 33b serving as the collector, and a voltage of the P-well 33b also becomes the voltage of the intermediate terminal VC2. As a result, a voltage of the input terminal of the reset circuit 31a becomes high. Then, the reset circuit 31a forcibly resets a given flip flop (not shown) or the like contained in the logical circuit 31, whereby the logical circuit 31 is reset, and the logical circuit 31 does not output a signal for making the battery device unusable.

Here, the voltage of the intermediate terminal VC2 becomes substantially equal to the voltage of the power supply terminal VDD by means of the parasitic bipolar transistors 32 and 33. The voltage of the power supply terminal VDD is the power supply voltage of the logical circuit 31 and the reset circuit 31a, and thus the voltage of the intermediate terminal VC2 becomes the power supply voltage of the logical circuit 31 and the reset circuit 31a. Therefore, when the voltage of the P-well 33b becomes substantially equal to the voltage of the intermediate terminal VC2, the logical circuit 31 and the reset circuit 31a recognize that the voltage of the P-well 33b becomes high.

Next, a description is given of the operation of the battery protection circuit 30 in a case where the battery protection circuit 30 has been connected to the batteries BAT1 to BAT4, the switches SW1 to SW5 are turned on, the ground terminal VDD is connected to the positive electrode terminal of the battery BAT1, the intermediate terminals VC1 to VC3 are connected to the positive electrode terminals of the batteries BAT2 to BAT4, respectively, and the ground terminal VSS is connected to the negative electrode terminal of the battery BAT4.

The N-substrate has the highest voltage in the battery protection circuit 30, and thus the forward current does not flow from the intermediate terminal VC2 to the power supply terminal VDD via the parasitic diode, and the parasitic bipolar transistors 32 and 33 do not operate. Accordingly, the current is consumed less by that amount. Here, the pull-down resistor 34 pulls down the P-well 33b, whereby the voltage of the P-well 33b is determined around the ground voltage.

The batteries BAT1 to BAT4 are charged, and thus the voltages of the batteries BAT1 to BAT4 are increased. When the voltage of any one of the batteries BAT1 to BAT4, for example, the voltage of the battery BAT3 is equal to or higher than the reference voltage of the reference voltage circuit 38a, an output voltage of the comparator circuit 38 becomes high. At this time, the battery BAT3 is in an overcharged state. Delay processing or the like is performed on a high signal indicating the above by the logical circuit 31, and the high signal is output from the output terminal VOUT as an overcharge detection signal.

During the delay processing performed by the logical circuit 31, when the voltage of the battery BAT3 is smaller than the reference voltage of the reference voltage circuit 38a, the output voltage of the comparator circuit 38 becomes low. At this time, the battery BAT3 is in a normal state. A low signal indicating the above is input to the input terminal of the reset circuit 31a as an overcharge detection release signal.

As a result, before all the terminals of the battery protection circuit 30 are each connected to the batteries BAT1 to BAT4, even when the logical circuit 31 malfunctions by the operation of the parasitic bipolar transistor 32 formed of the P-well 32a and the P-well 32b due to a connection order in which the batteries BAT1 to BAT4 are connected, the logical circuit 31 is reset by the operation of the parasitic bipolar transistor 33 formed of the P-well 32a and the P-well 33b. For this reason, the charge/discharge path of the batteries BAT1 to BAT4 is not interrupted due to the connection order of the batteries BAT1 to BAT4. Accordingly, limitations are not placed on the connection order, whereby a manufacturing process of the battery device is simplified and a yield is increased. Therefore, a manufacturing cost for the battery device is reduced.

The logical circuit 31 does not malfunction simply through the provision of the P-well 33b and the pull-down resistor 34, and thus device isolation is not required so as to prevent the logical circuit 31 from malfunctioning by employing a complicated manufacturing process. Therefore, the complicated manufacturing process is not required, which reduces the manufacturing cost.

It should be noted that FIG. 2 illustrates only the parasitic diode and the parasitic bipolar transistor provided for the intermediate terminal VC2, but, in reality, there are also formed parasitic diodes (not shown) and parasitic bipolar transistors (not shown) provided for the intermediate terminal VC1 and the intermediate terminal VC3. At this time, respective P-wells connected to the respective intermediate terminals may be surrounded by one P-well, or may be each surrounded by a different P-well.

The P-well 32b is included in the logical circuit 31, but may be included in the reference voltage circuit or the comparator circuit.

Four batteries are used in FIG. 2, but batteries of less than four or equal to or more than five may be used. At this time, in accordance with the number of the batteries, there are provided a switch, an intermediate terminal, and a P-well which surrounds a P-well connected to the intermediate terminal.

In a case where a circuit design is made so that the overcharge detection release signal is a high signal, a node of the overcharge detection release signal may be connected to the P-well 33b. At this time, even when the overcharge detection release signal is output or even when the voltage of the P-well 33b becomes high, the logical circuit 31 does not output a signal for making the battery device unusable.

An output terminal of other component having a reset function may be connected to the P-well 33b as well. At this time, even when the reset function of the other component works or even when the voltage of the P-well 33b becomes high, the logical circuit 31 does not output the signal for making the battery device unusable.

The battery protection circuit 30 is formed on the N-substrate, and the power supply terminal VDD, the intermediate terminals VC1 to VC3, and the ground terminal VSS are connected to the batteries BAT1 to BAT4 in the stated order, respectively, whereby the logical circuit 31 does not output the signal for making the battery device unusable.

The battery protection circuit 30 is formed on a P-substrate, and the ground terminal VSS, the intermediate terminals VC3 to VC1, and the power supply terminal VDD are connected to the batteries BAT4 to BAT1 in the stated order, respectively, whereby the logical circuit 31 does not output the signal for making the battery device unusable.

Second Embodiment

Figure 3:
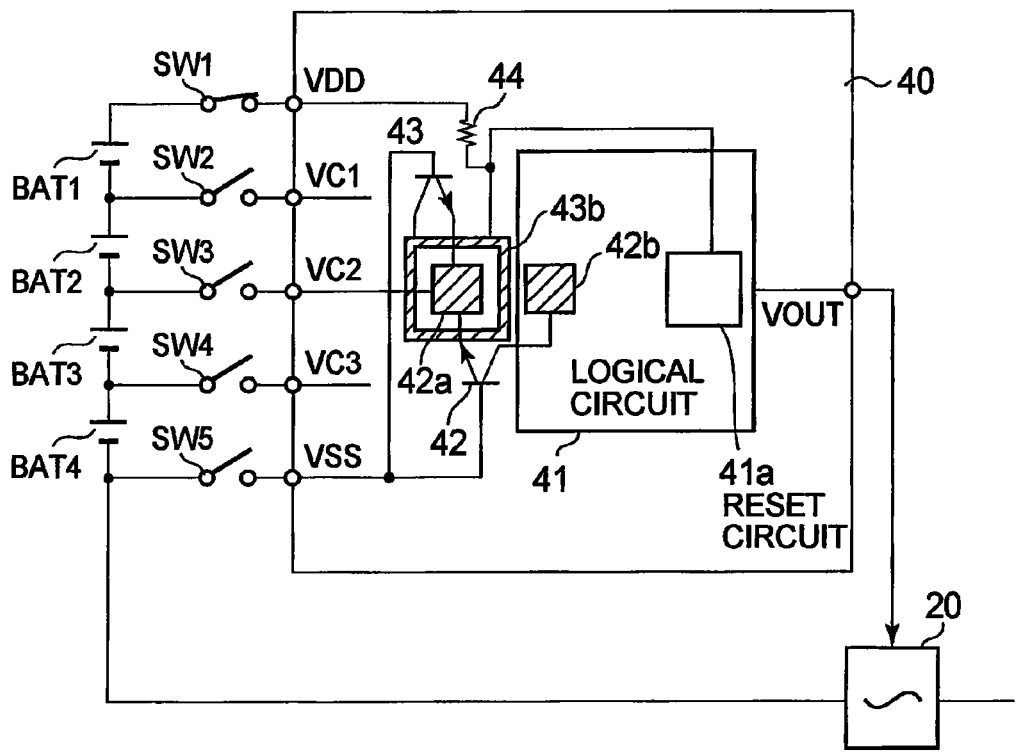
FIG. 3 is a layout diagram illustrating another battery protection circuit.
Figure 4:
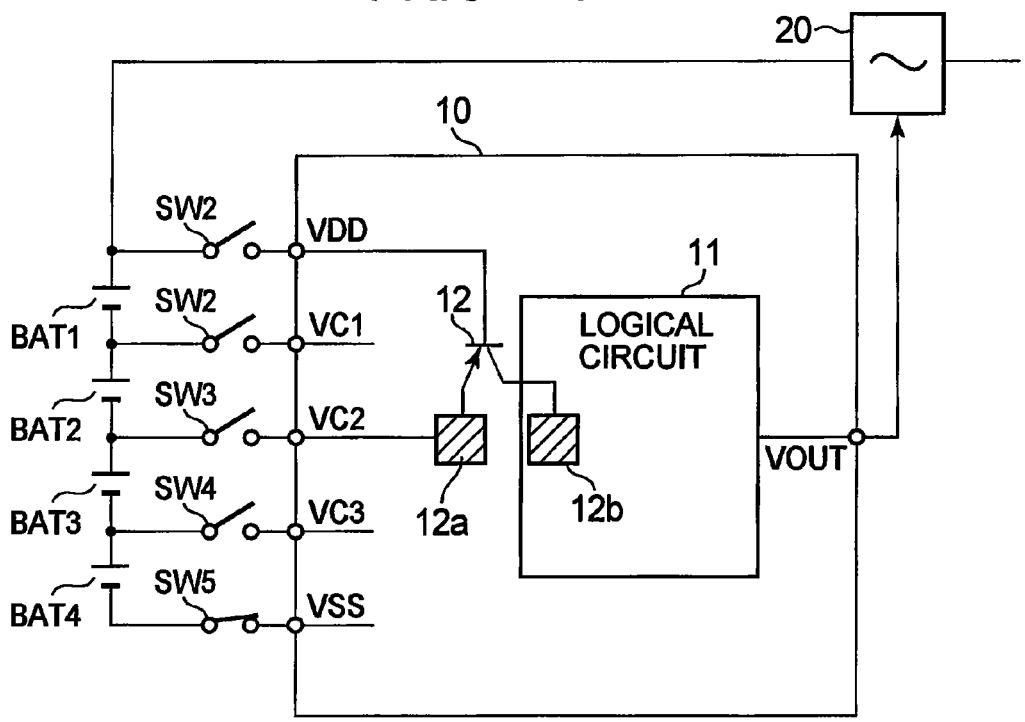
FIG. 4 is a layout diagram illustrating a conventional battery protection circuit.

The battery protection circuit 30 is formed on the N-substrate in FIG. 2, but as illustrated in FIG. 3, a battery protection circuit 40 may be formed on a P-substrate. Then, the parasitic bipolar transistor is a PNP bipolar transistor in FIG. 2, but is an NPN bipolar transistor in FIG. 3. In addition, the fuse 20 is provided between the output terminal VOUT and the positive electrode terminal of the battery BAT1 in FIG. 2, but is provided between the output terminal VOUT and the negative electrode terminal of the battery BAT4.

First, a configuration of the battery protection circuit is described. FIG. 3 is a layout diagram illustrating the battery protection circuit.

A battery device includes batteries BAT1 to BAT4, switches SW1 to SW5, the battery protection circuit 40, and the fuse 20. The battery protection circuit 40 includes a power supply terminal VDD, intermediate terminals VC1 to VC3, a ground terminal VSS, and an output terminal VOUT. In addition, the battery protection circuit 40 includes a pull-up resistor 44, comparator circuits (not shown), reference voltage circuits (not shown), and a logical circuit 41. The logical circuit 41 includes a reset circuit 41a. The comparator circuits and the reference voltage circuits function as a monitoring circuit.

The comparator circuit includes an N-well 42a and an N-well 43b. The logical circuit 41 includes an N-well 42b. The battery protection circuit 40 includes a parasitic diode which is formed between the N-well 42a connected to the intermediate terminal VC2 and the P-substrate. In addition, the battery protection circuit 40 includes a parasitic bipolar transistor 42 in which a base is the P-substrate, an emitter is the N-well 42a, and a collector is the N-well 42b. Moreover, the battery protection circuit 40 includes a parasitic bipolar transistor 43 in which a base is the P-substrate, an emitter is the N-well 42a, and a collector is the N-well 43b.

Here, the N-well 42a is provided at the intermediate terminal VC2. The N-well 42b is not provided at the intermediate terminal VC2 but provided in the vicinity of the N-well 42a. The N-well 43b is not provided at the intermediate terminal VC2 but provided in the vicinity of the N-well 42a so as to surround the N-well 42a.

The reset circuit 41a is designed so that a voltage of an input terminal of the reset circuit 41a becomes low when a voltage of the N-well 43b is substantially equal to a voltage of the intermediate terminal VC2.

Next, a description is given of an operation of the battery protection circuit 40 in a case where the intermediate terminal VC2 is connected before the ground terminal VSS is connected, the battery protection circuit 40 is being connected to the batteries BAT1 to BAT4, only the switch SW1 and the switch SW3 are turned on, the power supply terminal VDD is connected to a positive electrode terminal of the battery BAT1, and the intermediate terminal VC2 is connected to a positive electrode terminal of the battery BAT3.

A voltage of the N-well 42a becomes the voltage of the intermediate terminal VC2, and a voltage of the P-substrate becomes higher than a voltage of the N-well 42a, whereby a forward current flows from the ground terminal VSS to the intermediate terminal VC2 via the parasitic diode, and the parasitic bipolar transistor 42 operates in response to the forward current (base current). Accordingly, a current flows from the N-well 42b serving as the collector to the N-well 42a serving as the emitter, and a voltage of the N-well 42b becomes the voltage of the intermediate terminal VC2.

At this time, the parasitic bipolar transistor 43 also operates in the similar manner as described above, a current flows from the N-well 43b serving as the collector to the N-well 42a serving as the emitter, a voltage of the N-well 43b also becomes the voltage of the intermediate terminal VC2, and the voltage of the input terminal of the reset circuit 41a becomes low. As a result, the reset circuit 41a forcibly resets a given flip flop (not shown) or the like contained in the logical circuit 41. Accordingly, the logical circuit 41 is reset, and does not output a signal for making the battery device unusable.

The invention claimed is:

1. A battery protection circuit for protecting a plurality of batteries connected in series, comprising:
   a power supply terminal connected to a positive electrode terminal of a battery at an uppermost stage among the plurality of batteries connected in series;
   a ground terminal connected to a negative electrode terminal of a batter at a lowermost stage among the plurality of batteries connected in series;
   a plurality of intermediate terminals connected to a connection point between adjacent batteries of the plurality of batteries;
   a plurality of monitoring circuits for monitoring voltages of the plurality of batteries relative to a reference voltage, the plurality of monitoring circuits comprising:
   a plurality of first wells each connected to one of the plurality of intermediate terminals; and
   a plurality of second wells that each surround a corresponding well of the plurality of first wells;
   a logical circuit configured to cause interruption of a charge/discharge path of the plurality of batteries when the voltages of the plurality of batteries are equal to or greater than the reference voltage, the logical circuit connected to an output of each monitoring circuit of the plurality of monitoring circuits; and
   a plurality of third wells each provided in a vicinity of a corresponding well of the first wells.

2. The battery protection circuit of claim 1, where each of the wells in the plurality of first wells, plurality of second wells, and plurality of third wells comprise P-wells.

3. The battery protection circuit of claim 2, further comprising a pull-down resistor comprising:
   a first terminal connected to the ground terminal; and
   a second terminal connected to the logical circuit and to the plurality of second wells.

4. The battery protection circuit of claim 1, further comprising a substrate on which the battery protection circuit is formed, the substrate comprising either an N-substrate or a P-substrate.

5. The battery protection circuit of claim 4, further comprising a plurality of parasitic bipolar transistors, each comprising:
   a base comprising the substrate;
   an emitter comprising a corresponding well of the plurality of first wells; and
   a collector comprising a corresponding well of the plurality of third wells.

6. The battery protection circuit of claim 4, further comprising a plurality of parasitic bipolar transistors, each comprising:
   a base comprising the substrate;
   an emitter comprising a well of the plurality of first wells; and
   a collector comprising a well of the plurality of second wells.

7. The battery protection circuit of claim 1, where each of the wells in the plurality of first wells, plurality of second wells, and plurality of third wells comprise N-wells.

8. The battery protection circuit of claim 7, further comprising a pull-up resistor comprising:
   a first terminal connected to the power supply terminal; and
   a second terminal connected to the logical circuit and to the plurality of second wells.

9. The battery protection circuit of claim 1, the plurality of monitoring circuits each comprising:
a reference voltage circuit configured to supply the reference voltage;
a comparator circuit comprising:
a well of the plurality of first wells; and
a well of the plurality of second wells.

10. The battery protection circuit of claim 1, the plurality of intermediate terminals comprising N−1 intermediate terminals, and the plurality of monitoring circuits comprising N monitoring circuits, where N is a number of batteries in the plurality of batteries.

11. The battery protection circuit of claim 10, the N monitoring circuits comprising a first monitoring circuit connected to the power supply terminal, and N−1 monitoring circuits each connected to one of the N−1 intermediate terminals.

12. The battery protection circuit of claim 10, the N monitoring circuits comprising a first monitoring circuit connected to the ground terminal, and N−1 monitoring circuits each connected to one of the N−1 intermediate terminals.

13. A battery protection circuit for protecting a first and a second battery connected in series, comprising:
a power supply terminal connected to a positive electrode terminal of the first battery;
an intermediate terminal connected to a negative electrode terminal of the first battery and to a positive electrode terminal of the second battery;
a first monitoring circuit connected to the intermediate terminal, the first monitoring circuit comprising:
a first well connected to the intermediate terminal;
a second well that surrounds the first well;
a logical circuit connected to the first monitoring circuit and configured to cause interruption of a charge/discharge path of the first or second battery when the voltage of the first or second battery are equal to or greater than a predetermined voltage, the voltage circuit comprising:
a third well provided in a vicinity of the first well.

14. The battery protection circuit of claim 13, where the first, second, and third wells each comprise an N-well.

15. The battery protection circuit of claim 14, further comprising:
a ground terminal connected to a negative electrode of the second battery; and
a second monitoring circuit connected to the ground terminal for monitoring a voltage of the second battery relative to a reference voltage, and
where the first monitoring circuit connected to the intermediate terminal monitors a voltage of the first battery relative to the reference voltage.

16. The battery protection circuit of claim 14, further comprising a pull-up resistor comprising:
a first terminal connected to the power supply terminal; and
a second terminal connected to the logical circuit and to the second well.

17. The battery protection circuit of claim 13, where the first, second, and third wells each comprise an P-well.

18. The battery protection circuit of claim 17, further comprising a second monitoring circuit connected to the power supply terminal for monitoring a voltage of the first battery relative to a reference voltage, where the first monitoring circuit connected to the intermediate terminal monitors a voltage of the second battery relative to the reference voltage.

19. The battery protection circuit of claim 17, further comprising:
a ground terminal connected to a negative terminal of the second battery; and
a pull-down resistor comprising:
a first terminal connected to the ground terminal; and
a second terminal connected to the logical circuit and to the second well.

* * * * *